United States Patent
Wang et al.

(10) Patent No.: US 10,725,509 B2
(45) Date of Patent: Jul. 28, 2020

(54) PROCESSOR MONITORING OF THERMAL DEGRADATION

(71) Applicant: Hewlett-Packard Development Company, L.P., Houston, TX (US)

(72) Inventors: Chin-Yu Wang, Taipei (TW); Sheng-Lung Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 205 days.

(21) Appl. No.: 15/329,200

(22) PCT Filed: Jul. 29, 2014

(86) PCT No.: PCT/US2014/048595
§ 371 (c)(1),
(2) Date: Jan. 25, 2017

(87) PCT Pub. No.: WO2016/018249
PCT Pub. Date: Feb. 4, 2016

(65) Prior Publication Data
US 2017/0212562 A1 Jul. 27, 2017

(51) Int. Cl.
*G06F 1/20* (2006.01)
*G06F 9/4401* (2018.01)
*G06F 11/07* (2006.01)
*G06F 11/30* (2006.01)
*G06F 11/34* (2006.01)

(52) U.S. Cl.
CPC ............ *G06F 1/206* (2013.01); *G06F 9/4403* (2013.01); *G06F 11/0757* (2013.01); *G06F 11/3024* (2013.01); *G06F 11/3409* (2013.01)

(58) Field of Classification Search
CPC ... G05D 23/1917; G06F 11/3428; G06F 1/20; G06F 1/206; G06F 9/4403; H05K 7/1454; H04B 1/28; F24F 11/30
See application file for complete search history.

(56) References Cited

U.S. PATENT DOCUMENTS

| | | | |
|---|---|---|---|
| 5,623,647 A | | 4/1997 | Maitra |
| 5,752,011 A | * | 5/1998 | Thomas ................. G06F 1/206 713/501 |
| 5,906,315 A | * | 5/1999 | Lewis ...................... F24F 11/30 236/49.3 |
| 6,487,656 B1 | * | 11/2002 | Kim ...................... G06F 9/4403 713/2 |

(Continued)

OTHER PUBLICATIONS

ADT7473, Remote Thermal Monitor and Fan Control, Jun. 2012, pp. 1-73, Rev. 9, Publication Order No. ADT7473/D, Semiconductor Components Industries, LLC., Available at: <onsemi.com/pub_link/Collateral/ADT7473-D.PDF>.

*Primary Examiner* — Regis J Betsch
*Assistant Examiner* — Kaleria Knox
(74) *Attorney, Agent, or Firm* — Brooks Cameron & Huebsch PLLC

(57) ABSTRACT

A method includes executing an initialization routine upon startup of a processor. The method includes executing a benchmark program during the initialization routine after the startup. The method further includes comparing an amount of time for execution of the benchmark program to a reference time to determine if the processor has slowed due to thermal degradation of heat removal components for the processor.

17 Claims, 4 Drawing Sheets

(56) References Cited

U.S. PATENT DOCUMENTS

| | | | |
|---|---|---|---|
| 6,496,364 B1* | 12/2002 | Medin | H05K 7/1454 |
| | | | 312/223.1 |
| 7,036,030 B1* | 4/2006 | Altmejd | G06F 1/3228 |
| | | | 713/322 |
| 7,425,812 B2 | 9/2008 | Goldberg | |
| 8,164,434 B2 | 4/2012 | Gross et al. | |
| 8,280,673 B2* | 10/2012 | Aljabari | G01K 1/20 |
| | | | 702/130 |
| 8,606,428 B2 | 12/2013 | Chan | |
| 8,712,597 B2 | 4/2014 | Rozzi | |
| 2005/0068025 A1 | 3/2005 | Escobar et al. | |
| 2005/0174737 A1* | 8/2005 | Meir | G06F 1/20 |
| | | | 361/697 |
| 2007/0097620 A1 | 5/2007 | Leech et al. | |
| 2009/0271049 A1* | 10/2009 | Kinney | G05D 23/1917 |
| | | | 700/300 |
| 2009/0276762 A1* | 11/2009 | Ponitsch | G06F 11/3428 |
| | | | 717/127 |
| 2010/0218170 A1* | 8/2010 | MacLellan | G06F 11/3428 |
| | | | 717/127 |
| 2011/0078479 A1* | 3/2011 | Vogman | G06F 1/206 |
| | | | 713/340 |
| 2011/0150045 A1* | 6/2011 | Thompson | H04B 1/28 |
| | | | 375/147 |
| 2012/0272100 A1 | 10/2012 | Chase et al. | |
| 2013/0031390 A1* | 1/2013 | Smith, III | G06F 1/206 |
| | | | 713/320 |
| 2013/0131885 A1 | 5/2013 | Huang et al. | |
| 2014/0188434 A1* | 7/2014 | Steinbrecher | H05K 7/20836 |
| | | | 702/184 |

\* cited by examiner

PROCESSOR MONITORING OF THERMAL DEGRADATION

CROSS-REFERENCE TO RELATED APPLICATION

This application is a U.S. National Stage Application of and claims priority to International Patent Application No. PCT/US2014/048595, filed on Jul. 29, 2014, and entitled "PROCESSOR MONITORING OF THERMAL DEGRADATION," which is hereby incorporated by reference in its entirety.

BACKGROUND

Heat sinks and fans are the main cooling components of today's computer systems. Without such cooling components, processor lifetime would be severely limited due to overheating and performance of the computer system would also suffer. Over time, dust or other particulate contaminants can build up on the respective heat sinks and in the fans which can degrade the cooling system performance. Some thermal systems have been developed where the performance of the heat sinks and/or fans are monitored to determine if such degradation has occurred. These systems sometimes rely on complex air-flow models and heat models to detect whether or not the cooling system is operating effectively.

DETAILED DESCRIPTION

Figure 1:
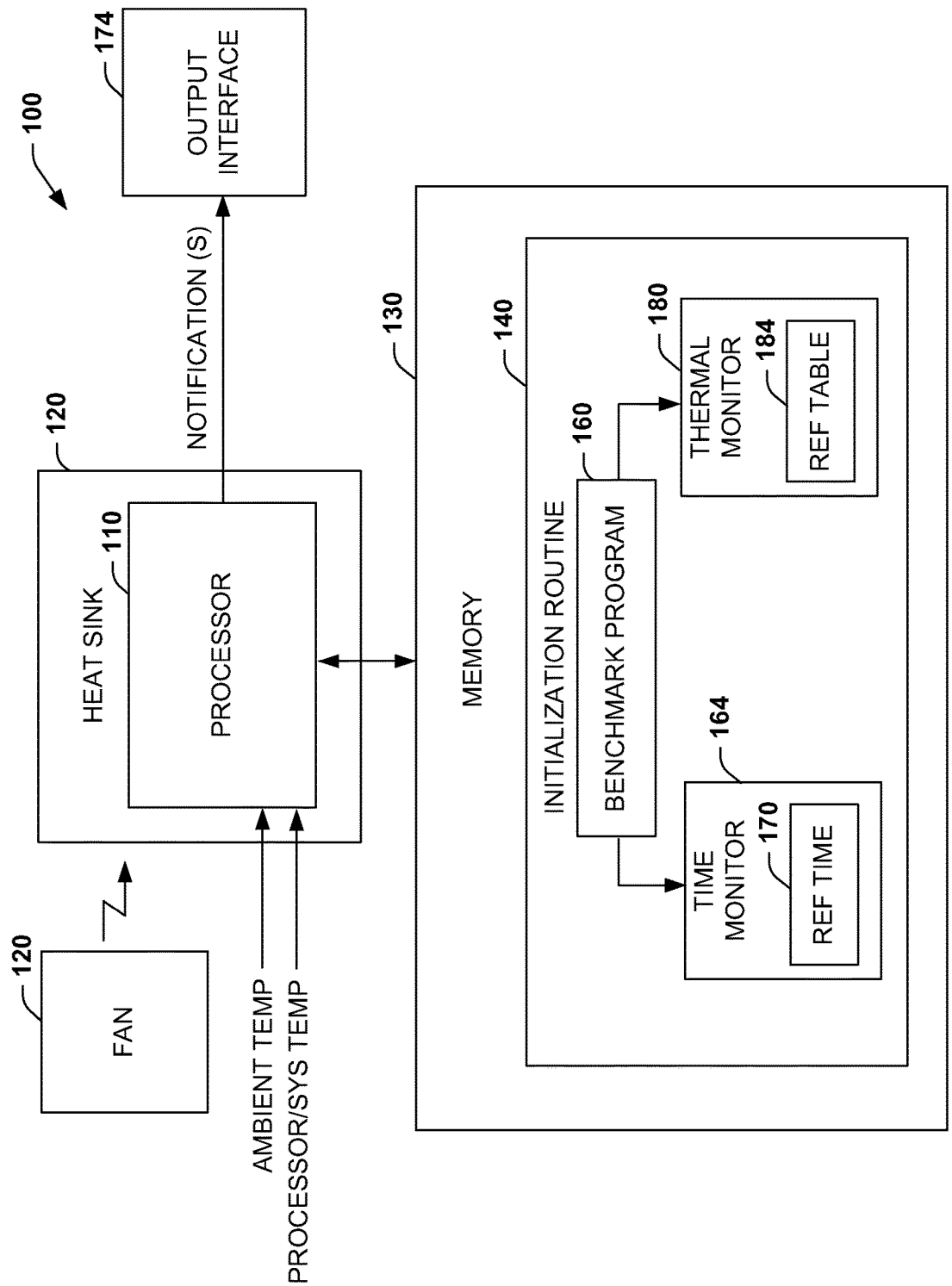
FIG. 1 illustrates an example of a system that monitors processor performance to detect thermal performance degradation of the system.

This disclosure relates to a system and method to detect cooling component degradation of a computer system. A reference platform can be employed to measure processor performance when cooling components such as a heat sink and fan are functioning at peak efficiency. A benchmark program is executed to determine how long such program takes to execute on the reference platform. Overtime, as the cooling component performance degrades due to particulate contamination on an installed system, the benchmark program can be executed on the installed system to detect whether or not processor performance has slowed with respect to the execution time of benchmark program on the reference platform. This can be achieved by comparing an amount of time for execution of the benchmark program (e.g., determined on the installed system) to a reference time (e.g., determined previously on the reference platform) to determine if the processor has slowed due to thermal degradation of the heat removal components for the processor. Such slowing or throttling of the processor can be an early indicator of cooling component degradation which is overlooked by conventional cooling models.

The processor on the installed system can set a watchdog timer to set a predetermined period of time for execution of the benchmark program to complete. The watchdog timer can be an electronic component or circuit which can be integrated in the system. The watchdog timer can issue a non-maskable interrupt or system reset signal, for example. If the watchdog timer should timeout and issue a reset signal to the platform before execution of the benchmark program, a warning notification can be issued in a succeeding Power-On-Self-Test, for example, if the benchmark program does not execute in the predetermined period of time set by the watchdog timer.

If the watchdog timer should timeout before execution of the benchmark program in an operating system environment, a warning notification can be issued by a predefined interrupt service routine, for example, if the benchmark program does not execute in the predetermined period of time set by the watchdog timer. If the benchmark program executes before the watchdog times out, a throttling notification can be issued if the amount of time for execution of the benchmark program exceeds a predetermined threshold of time past the reference time and before the predetermined period of time has expired. The throttling notification indicates that the processor has slowed due to thermal degradation of the heat removal components for the processor.

By monitoring execution time of the processor over time, performance degradation can be detected which cannot be achieved by conventional thermal monitoring systems. Since such conventional systems only monitor the cooling efficiency of heat removal components without regard to processor performance, these models can be misled if the processor slows its performance due to overheating. When the processor slows or throttles its performance, less heat is generated by the processor and thus can cause conventional models to misdiagnose potential heating performance problems that have already occurred. In addition to the performance monitoring described herein, ambient and processor temperatures can be monitored over time to detect whether or not the processor is operating within acceptable operating limits with respect to both performance and temperature.

FIG. 1 illustrates an example of a system 100 that monitors processor performance to detect thermal performance degradation of the system. The system 100 includes a processor 110 that is cooled via a heat sink 114 and fan 120 that are collectively referred to as cooling components. The processor 110 executes programs having computer executable instructions from a memory 130. The memory 130 includes an initialization routine 140 executed by the processor 110 to determine whether or not the performance of the heat sink 114 and/or fan 120 have degraded. Such degradation can include the gathering of dust for example which can reduce the effectiveness of the heat sink 114 and/or cause a slowing/clogging of the fan 120.

The processor 110 executes the initialization routine 140 upon startup of the processor. The initialization routine 140 is executed out of a BIOS routine so that performance of the processor can be determined without other system programs (e.g., user applications) being executed. Although processor performance is typically monitored during the initialization routine 140 to determine performance, such performance monitoring could also be achieved in an application routine that ran outside of the initialization routine (e.g., application that ran on a timed interrupt). Upon startup of the processor 110, the processor executes a benchmark program 160 during the initialization routine 140.

The benchmark program 160 can be executed by the processor 110 to determine how long the program takes to execute on a reference platform (not shown). As used herein, the term reference platform refers to a computer system that has a pristine heat sink 114 and fan 110 that are operating near maximum efficiency where time and temperatures are measured and used on an installed system (e.g., the system 100) to determine performance. The benchmark program 160 can be any routine such as a mathematical routine, counting routine, cache operation, memory operation, and so forth.

Overtime, as the cooling component performance degrades due to particulate contamination of the cooling components 114 and 120 on the installed system 100, the benchmark program 160 can be executed on the installed system to detect whether or not processor performance has slowed with respect to the execution time of the benchmark program on the reference platform. This can be achieved by a time monitor 164 that compares an amount of time for execution of the benchmark program (e.g., determined on the installed system) to a reference time 170 (e.g., determined previously on the reference platform) to determine if the processor 110 has slowed due to thermal degradation of the heat removal components such as the heat sink 114 and fan 120 for the processor. As used herein, the term thermal degradation refers to the lowering of heat removal efficiency of the heat removal components described herein, Such slowing or throttling of the processor 110 can be an early indicator of cooling component degradation which is overlooked by conventional cooling monitors and models.

The reference time 170 can be determined by executing the benchmark program 160 on the reference platform before the thermal degradation of the heat removal components 114 and 120 has occurred. In one example, the time monitor 164 sets a watchdog timer (not shown) to set a predetermined period of time for execution of the benchmark program 160 to complete. Under severe heat performance degradation, the processor 110 may not be able to execute before the watchdog times out. Thus, the watchdog timer can issue a reset or interrupt signal to the processor 110. A warning notification can be issued by the processor 110 if the benchmark program 160 does not execute in the predetermined period of time set by the watchdog timer. As shown, notifications can be generated by the processor 110 to an output interface 174.

Another type of notification that can be issued by the processor 110 includes a throttling notification. For example, if the amount of time for execution of the benchmark program 160 exceeds a predetermined threshold of time past the reference time 170 and before the predetermined period of time has expired as set by the watchdog timer, the throttling notification can be issued to indicate that the processor 110 has slowed due to thermal degradation of the heat removal components for the processor. When the processor 110 has heated past a temperature threshold, it typically will throttle its performance which has the effect of lowering the processor temperature. Thus, if only the performance of the heat sink 114 and fan 110 were being monitored as is conventional, it is possible that this monitoring would not detect monitored heat thresholds since the processor throttling lowered the amount of heat generated. The system 100 overcomes such deficiencies by monitoring whether or not the processor 110 has slowed its performance and thus can more accurately determine performance degradation of the cooling components 114 and 120 while concurrently detecting execution slowing of the processor.

A thermal monitor 180 can be provided to monitor a temperature for the processor 110 and an ambient temperature for the execution environment of the processor over time to determine thermal performance of the processor after execution of the benchmark program 160. As shown, the processor 110 receives an ambient temperature input and a processor/system temperature input. The ambient temperature input can include monitoring the general temperature inside a computer housing, for example. The processor/system input can include direct measurements of the processor temperature and/or measurements that are very close to the processor 110. Such measurements can be generated via a thermal diode or other heat sensor, for example.

The thermal monitor 180 can search a reference table 184 of ambient temperatures and processor temperatures to determine a reference temperature (e.g., search reference table and locate reference temperature based on ambient and processor temperatures over time). The reference temperature represents a processor temperature measured on the reference platform after executing the benchmark program 160. Thus, after the benchmark program 160 has executed, a current processor/system temperature can be measured by the processor 110 and compared to the reference temperature derived from the reference table 184 which was recorded when the benchmark program had executed on the reference platform. A thermal warning notification can be generated to the output interface 174 if the current processor temperature exceeds the reference temperature plus a predetermined threshold temperature (e.g., set as a predetermined amount above reference temperature). If the threshold is not exceeded, the processor 110 can issue a message that the thermal system is operating acceptably (e.g., processor temperature is below the reference temperature and the predetermined threshold temperature).

Figure 2:
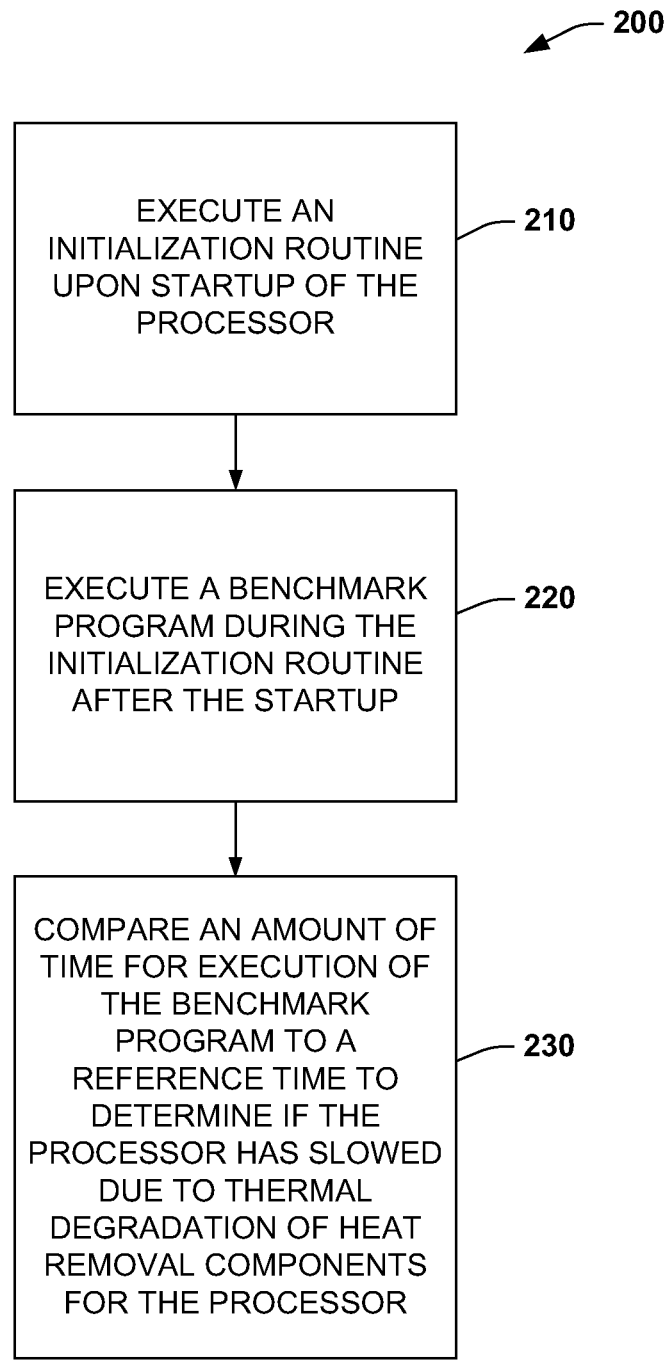
FIG. 2 illustrates an example method that monitors processor performance to detect thermal performance degradation of a computer system.
Figure 3:
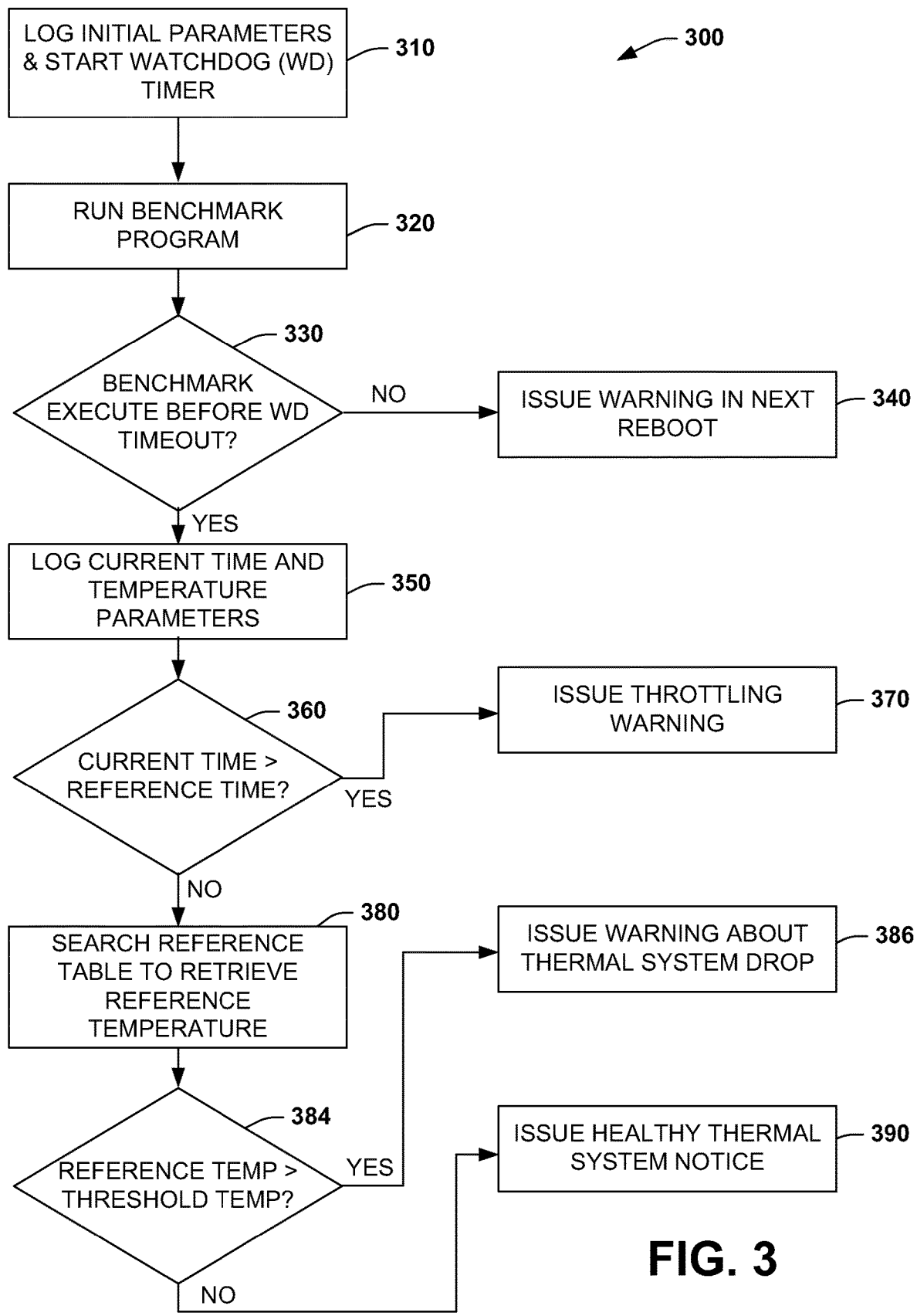
FIG. 3 illustrates an example method that monitors processor performance and temperature to detect thermal performance degradation of a computer system.

In view of the foregoing structural and functional features described above, example methods will be better appreciated with reference to FIGS. 2 and 3. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured an executed by an integrated circuit, computer, processor, or a controller, for example.

FIG. 2 illustrates an example method 200 that monitors processor performance to detect thermal performance degradation of a computer system. At 210, the method 200 includes executing an initialization routine upon startup of a processor (e.g., processor 110 executing initialization routine 140 of FIG. 1). At 220, the method includes executing a benchmark program during the initialization routine after the startup (e.g., processor 110 executing benchmark program 160 of FIG. 1). As noted previously, the benchmark program can include any series of instructions that execute in a measured amount of time on a reference platform. At 230, the method 200 includes comparing an amount of time for execution of the benchmark program to a reference time to determine if the processor has slowed due to thermal degradation of heat removal components for the processor (e.g., processor 110 executing thermal monitor 164 of FIG. 1). The reference time can be determined by executing the benchmark program on a reference platform before the thermal degradation of the heat removal components has occurred. As will be described below with respect to the method of FIG. 3, various notifications regarding the health of the cooling components (e.g., heat sink and fan) can be generated in accordance with the method 200.

FIG. 3 illustrates an example method 300 that monitors processor performance and temperature to detect thermal performance degradation of a computer system. At 310, the method 300 includes logging initial parameters and starting a watchdog timer. The watchdog timer can be employed to set a predetermined period of time for a benchmark program to execute and provide output signals to notify the system of a timeout. The initial parameters logged can include an ambient temperature, a current system/processor temperature, and a current time. At 320, the method 300 includes running a benchmark program. The benchmark program is a predetermined number of instructions to allow time for a processor to warm up. When the cooling system (e.g., fan/heat sink) is operating efficiently, the benchmark program operates at its maximum speed. Over time, and as dust accumulates for example, the benchmark program slows which can be detected to generate notifications and/or other automated actions.

At 330, the method 300 determines if the benchmark program completes before the watchdog timer times out. If the benchmark program does not complete in time, a warning notice is issued at 340 during the next reboot of the system. In some examples, if the watchdog timer times out, a reboot can be initiated by the watchdog timer. At 350, the method 300 logs a current time and a current temperature representing a time and temperature after execution of the benchmark program at 320. At 360, the current time is compared to a reference time. The reference time is a stored parameter that was measured on a reference platform when the cooling system was operating at maximum efficiency (or near maximum). If the current time exceeds the reference time at 360, a throttling warning can be issued at 370 to notify the user that processor performance has slowed due to thermal degradation of the cooling components for the processor (e.g., heat sink and/or fan).

Figure 4:
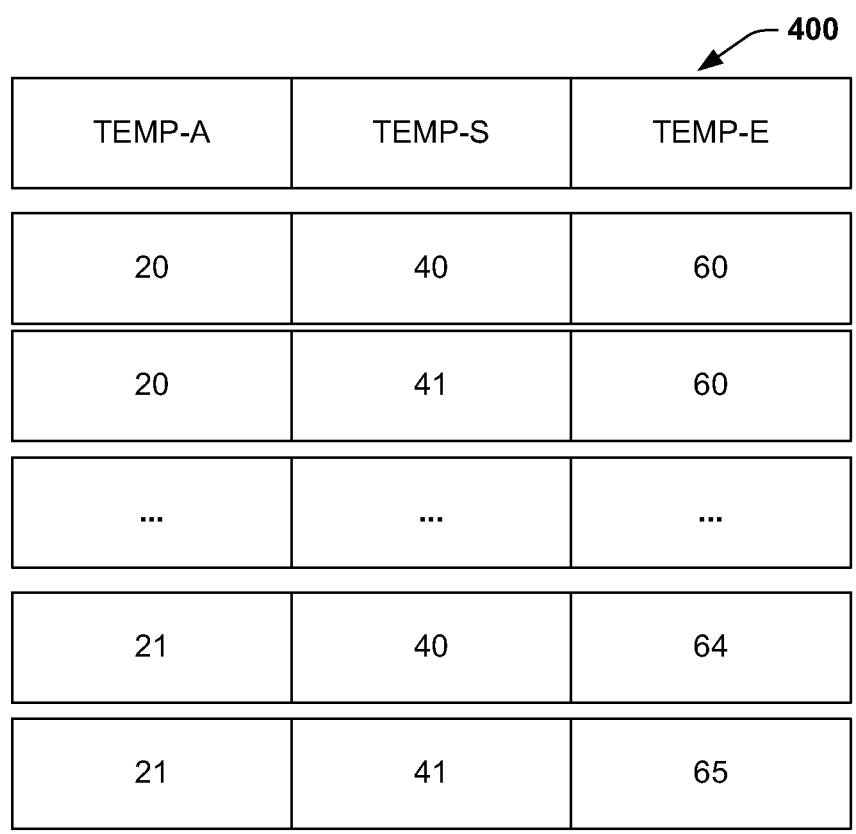
FIG. 4 illustrates an example of a reference table to determine temperature changes over time a system that monitors processor performance to detect thermal performance degradation of the system.

At 380, the method 300 includes searching a reference table to retrieve a reference temperature. The reference temperature represents an expected temperature for the system/processor after execution of the benchmark program. Thus, the reference table represents a temperature slope of how temperature for the processor changes over time (e.g., after execution of the benchmark program), where the reference table represents stored values measured previously on a reference platform. An example reference table 400 is illustrated in FIG. 1. TEMP-A represents ambient temperature measured at startup of the processor on the reference platform. TEMP-S represents system and/or CPU temperatures measured on the reference platform before execution of the benchmark program. TEMP-E represents a reference temperature for system/processor temperature measured on the reference platform after execution of the benchmark program. The examples shown in FIG. 4 are merely for illustrative purposes, other example temperatures are possible.

Referring back to 380 of FIG. 3, the method 300 searches the reference table to find the reference temperature TEMP-E. At 384, the method 300 compares the reference temperature TEMP-E with the current temperature measured at 350 of the installed platform. If the current temperature exceeds the reference temperature TEMP-E plus a threshold temperature (e.g., reference temperature plus 10 degrees C.) at 384, the method 300 issues a warning that the efficiency of the thermal system has dropped. The user can then contact a technician to clean the heat sink and/or fan, for example, if such notice at 386 is issued. If the reference temperature plus the threshold temperature is below the threshold at 384, the method 300 can issue a healthy thermal system notice at 390. After issuance of the message at 390, the method can proceed out of initialization and initiate user applications and tasks.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

The invention claimed is:

1. A method comprising:
    executing, by a processor, an initialization routine upon startup of the processor;
    executing, by the processor, a benchmark program during the initialization routine after the startup;
    comparing, by the processor, an amount of time the processor took to execute the benchmark program to a reference time to determine if a performance of the processor has slowed due to thermal degradation of heat removal components for the processor, wherein the reference time is a quantity of time the processor took to execute the benchmark program on a reference platform; and
    issuing, by the processor, a throttling notification to indicate that the performance of the processor has been slowed in response to overheating.

2. The method of claim 1, wherein the benchmark program is executed by the processor in isolation from other system programs.

3. The method of claim 2, further comprising setting a watchdog timer to set a predetermined period of time for execution of the benchmark program to complete.

4. The method of claim 3, further comprising issuing a warning or reset notification if the benchmark program does not execute in the predetermined period of time set by the watchdog timer.

5. The method of claim 2, further comprising issuing the throttling notification if the amount of time for execution of the benchmark program exceeds a predetermined threshold of time past the reference time and before the predetermined period of time has expired.

6. The method of claim 5, further comprising monitoring a temperature for the processor and an ambient temperature for the execution environment of the processor over time to determine thermal performance of the processor after execution of the benchmark program.

7. The method of claim 6, further comprising searching a reference table of ambient temperatures and processor temperatures to determine a reference temperature, wherein the reference temperature represents a processor temperature measured on the reference platform after executing the benchmark program.

8. The method of claim 7, further comprising issuing a thermal warning if a current processor temperature exceeds the reference temperature plus a predetermined threshold temperature.

9. The method of claim 7, further comprising issuing a message that the thermal system is operating acceptably if processor temperature is below the reference temperature and the predetermined threshold temperature.

10. A non-transitory computer-readable medium comprising computer executable instructions that when executed cause a processor to:
   execute an initialization routine upon startup of the processor;
   execute a benchmark program during the initialization routine after the startup;
   compare an amount of time the processor took to execute the benchmark program to a reference time to determine if a performance of the processor has slowed due to thermal degradation of heat removal components for the processor, wherein the reference time is a quantity of time the processor took to execute the benchmark program on a reference platform;
   monitor, by a thermal monitor, a temperature for the processor and an ambient temperature for the execution environment of the processor over time to determine thermal performance of the processor after execution of the benchmark program;
   compare, by the thermal monitor, the temperature for the processor to a reference temperature representing an expected temperature for the processor after execution of the benchmark program on the reference platform;
   issue a throttling notification to indicate that the performance of the processor has been slowed in response to overheating based on the time for execution compared to the reference time and the monitored temperature; and
   issue a thermal warning that an efficiency of a thermal system has dropped responsive to a current processor temperature exceeding the reference temperature plus a predetermined threshold temperature.

11. The non-transitory computer-readable medium of claim 10, further comprising instructions to search a reference table of ambient temperatures and processor temperatures to determine the reference temperature.

12. The non-transitory computer-readable medium of claim 10, further comprising instructions to issue a throttling notification if the amount of time for execution of the benchmark program exceeds a predetermined threshold of time past the reference time.

13. A system, comprising:
   a processor to execute computer executable instructions from a memory, the computer executable instructions comprising:
   an initialization routine upon startup of the processor;
   a benchmark program executed by the processor during the initialization routine;
   a time monitor to compare an amount of time the processor took to execute the benchmark program to a reference time to determine if a performance of the processor has slowed due to thermal degradation of heat removal components for the processor, wherein the reference time is a quantity of time the processor took to execute the benchmark program on a reference platform;
   a thermal monitor to:
      monitor a temperature for the processor over time to determine thermal performance of the processor after execution of the benchmark program; and
      determine a reference temperature representing an expected temperature for the processor after execution of the benchmark program on the reference platform, wherein the reference temperature is further compared to the temperature for the processor;
   an output interface to:
      issue a throttling notification to indicate that the performance of the processor has been slowed in response to overheating based on the time for execution compared to the reference time and the monitored temperature; and
      issue a thermal warning that an efficiency of a thermal system has dropped responsive to a current processor temperature exceeding the reference temperature plus a predetermined threshold temperature.

14. The system of claim 13, the computer executable instructions further comprising a reference table of reference temperatures that include ambient temperatures and processor temperatures that are recorded before and after the benchmark program executes on the reference platform.

15. The system of claim 13, wherein the thermal monitor is to directly measure the current temperature of the processor.

16. The system of claim 13, wherein the thermal monitor is to indirectly measure the current temperature of the processor.

17. The system of claim 13, wherein the reference time is determined before the thermal degradation of the heat removal components has occurred.

* * * * *